US011759956B2

United States Patent
Mizuochi et al.

(10) Patent No.: US 11,759,956 B2
(45) Date of Patent: Sep. 19, 2023

(54) ROBOT SYSTEM AND CONTROL METHOD FOR ROBOT SYSTEM

(71) Applicant: Seiko Epson Corporation, Tokyo (JP)

(72) Inventors: Shunichi Mizuochi, Matsumoto (JP); Naoki Ogasawara, Matsumoto (JP)

(73) Assignee: SEIKO EPSON CORPORATION

( * ) Notice: Subject to any disclaimer, the term of this patent is extended or adjusted under 35 U.S.C. 154(b) by 187 days.

(21) Appl. No.: 17/118,678

(22) Filed: Dec. 11, 2020

(65) Prior Publication Data

US 2021/0178602 A1    Jun. 17, 2021

(30) Foreign Application Priority Data

Dec. 12, 2019   (JP) .................................. 2019-224689

(51) Int. Cl.
*B25J 9/16*      (2006.01)
*G05B 19/05*   (2006.01)
(Continued)

(52) U.S. Cl.
CPC ........... *B25J 9/1697* (2013.01); *B25J 9/1653* (2013.01); *B25J 13/088* (2013.01); *G05B 19/05* (2013.01);
(Continued)

(58) Field of Classification Search
CPC ...... B25J 9/1697; B25J 9/1653; B25J 13/088; B25J 9/08; B25J 9/1602; B25J 9/12;
(Continued)

(56) References Cited

U.S. PATENT DOCUMENTS

2002/0068994 A1* 6/2002 Hong ................. G05B 19/4155
                                                              318/568.12
2016/0240077 A1* 8/2016 Nagasaka .......... G05B 19/0423
(Continued)

FOREIGN PATENT DOCUMENTS

JP   H04-295902 A   10/1992
JP   H09-244713 A    9/1997
(Continued)

OTHER PUBLICATIONS

E. Paljug and Xiaoping Yun, "Experimental study of two robot arms manipulating large objects," in IEEE Transactions on Control Systems Technology, vol. 3, No. 2, pp. 177-188, Jun. 1995, doi: 10.1109/87.388126. (Year: 1995).*
(Continued)

*Primary Examiner* — Abby Y Lin
*Assistant Examiner* — Dylan Brandon Mooney
(74) *Attorney, Agent, or Firm* — Harness, Dickey & Pierce, P.L.C.

(57) ABSTRACT

A robot system includes a robot arm, encoders configured to acquire position information of the robot arm, a first control section configured to execute control processing for controlling operation of the robot arm, and a second control section provided independently from the first control section and configured to transmit a position information request signal for requesting the position information to the encoders. The second control section transmits an interrupt signal to the first control section according to the transmission of the position information request signal. The first control section executes the control processing based on the interrupt signal and the position information output from the encoders based on the position information request signal.

5 Claims, 5 Drawing Sheets

(51) Int. Cl.
  *B25J 9/08*        (2006.01)
  *B25J 13/08*       (2006.01)
  *G06V 20/10*       (2022.01)

(52) U.S. Cl.
  CPC ....... *B25J 9/08* (2013.01); *G05B 2219/15048* (2013.01); *G06V 20/10* (2022.01)

(58) Field of Classification Search
  CPC .......... G05B 19/05; G05B 2219/15048; G05B 2219/34359; G06V 20/10
  See application file for complete search history.

(56) References Cited

U.S. PATENT DOCUMENTS

2019/0369587 A1    12/2019  Muneta et al.
2020/0047344 A1*    2/2020  Kinugasa ........... G01D 5/24466

FOREIGN PATENT DOCUMENTS

JP    2000-339009 A    12/2000
JP    2002-082703 A     3/2002
JP    2018-132829 A     8/2018

OTHER PUBLICATIONS

D. Bar-On, D. Gershon, A. Israeli and G. Zuniga, "Track II: A multi-processor robot controller," 1993 CompEuro Proceedings Computers in Design, Manufacturing, and Production, 1993, pp. 86-93, doi: 10.1109/CMPEUR.1993.289817. (Year: 1993).*

* cited by examiner

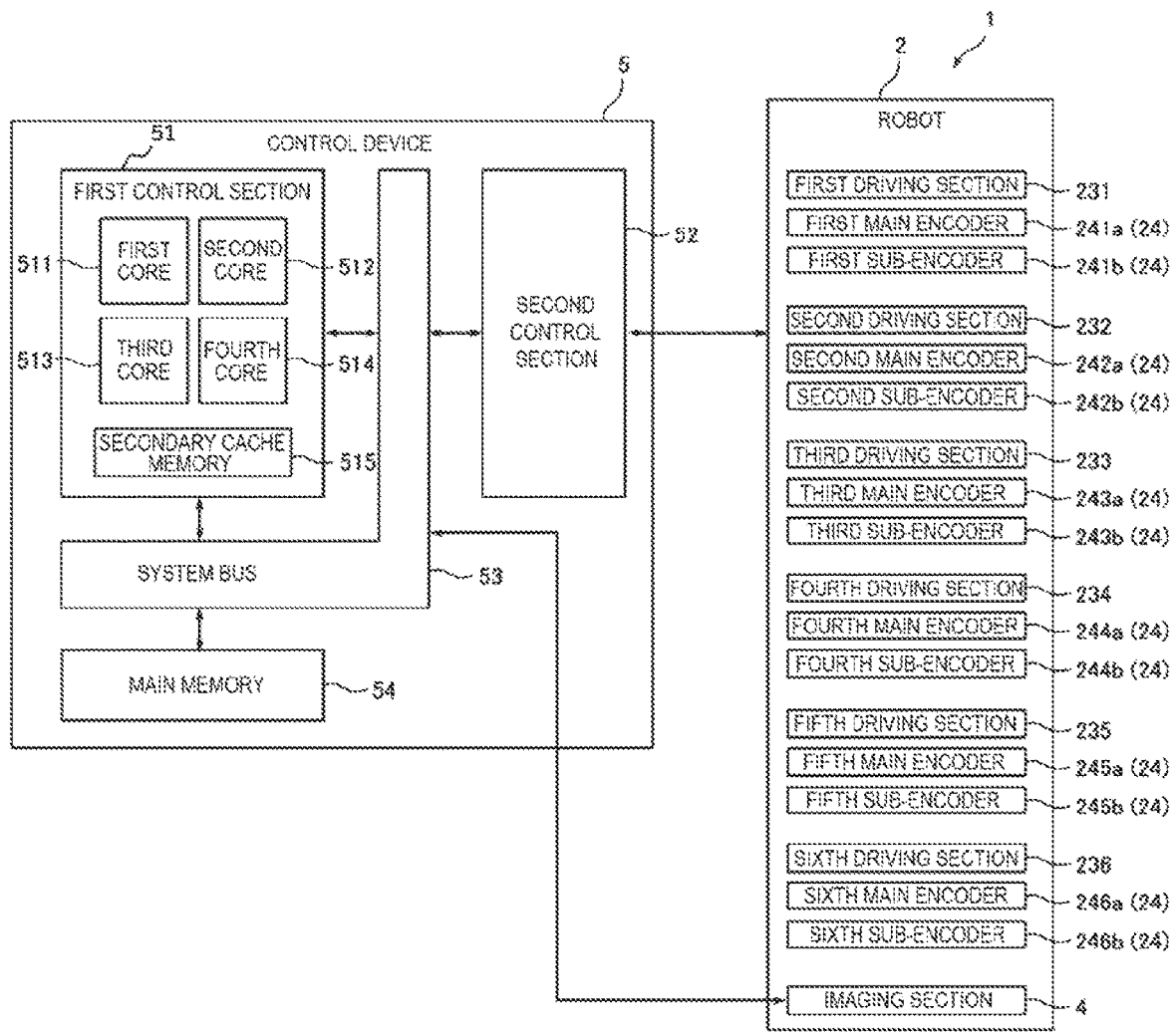

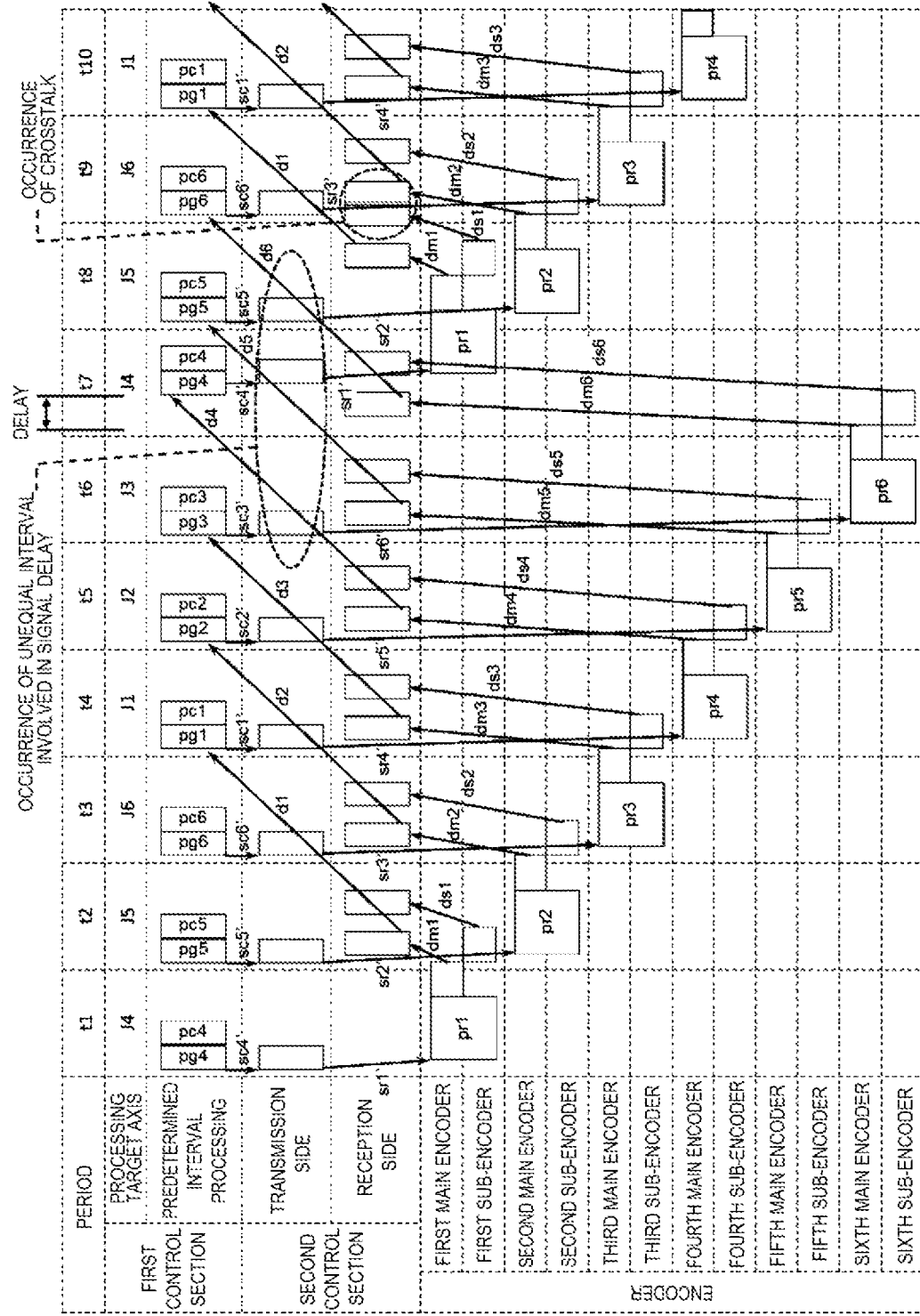

FIG. 6

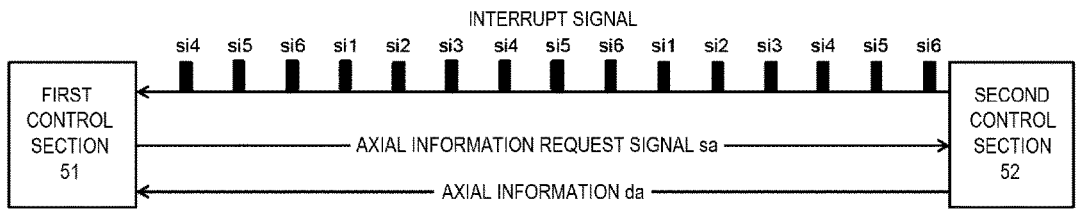

FIG. 7

NORMAL TIME

| INTERRUPT SIGNAL | si1 | si2 | si3 |
|---|---|---|---|
| FIRST CONTROL SECTION SIDE AXIS NUMBER | 1 | 2 | 3 |
| SECOND CONTROL SECTION SIDE AXIS NUMBER | 1 | 2 | 3 |

NOISE OCCURRENCE TIME — ABNORMAL SIGNAL

| INTERRUPT SIGNAL | si1 | si2 | sx | si3 |
|---|---|---|---|---|
| FIRST CONTROL SECTION SIDE AXIS NUMBER | 1 | 2 | 3 | 3 |
| SECOND CONTROL SECTION SIDE AXIS NUMBER | 1 | 2 | 2 | 3 |

— MISMATCH OCCURRENCE

MISSING OCCURRENCE TIME — MISSING OF SIGNAL

| INTERRUPT SIGNAL | si1 | — | si3 |
|---|---|---|---|
| FIRST CONTROL SECTION SIDE AXIS NUMBER | 1 | 1 | 2 |
| SECOND CONTROL SECTION SIDE AXIS NUMBER | 1 | 2 | 3 |

— MISMATCH OCCURRENCE

ROBOT SYSTEM AND CONTROL METHOD FOR ROBOT SYSTEM

The present application is based on, and claims priority from JP Application Serial Number 2019-224689, filed Dec. 12, 2019, the disclosure of which is hereby incorporated by reference herein in its entirety.

BACKGROUND

1. Technical Field

The present disclosure relates to a robot system and a control method for the robot system.

2. Related Art

JP-A-2018-132829 (Patent Literature 1) discloses, as a control device that controls control targets such as machines and equipment, a programmable logic controller including a CPU unit, a power supply unit, and an IO unit. The CPU unit includes a microprocessor, a memory, a chip set, and a communication controller including a system timer. The system timer generates an interrupt signal at every fixed time interval and provides the interrupt signal to the microprocessor. The microprocessor repeatedly executes a control program at a predetermined period using the interrupt signal generated by the system timer to thereby realize operation for controlling a control target.

In such a CPU unit, the microprocessor and the memory are coupled via the chip set. Therefore, when a control program with a large load is executed in the microprocessor, resources such as the chip set and the memory are sometimes occupied by the control program. At this time, when another program using the interrupt signal accesses the memory via the chip set, acquisition of data from the memory is sometimes delayed. Then, timing when the other program is executed deviates from original timing.

For example, in a robot including a robot arm, driving of the robot arm is controlled based on position information acquired by an encoder. The robot includes a camera. A control device processes an image captured by the camera to thereby use the image for driving control for the robot arm. Therefore, the control device of the robot is considered to have the same device configuration as a device configuration of the programmable logic controller described in Patent Literature 1.

In the robot in which the image processing explained above is performed, while the image processing is performed in the control device, resources of the control device are occupied by the image processing. Timing for requesting position information to the encoder deviates from original timing. As a result, accurate position information cannot be acquired. Accuracy of driving speed of the robot arm is deteriorated.

SUMMARY

A robot system according to an application example of the present disclosure includes: a robot arm; encoders configured to acquire position information of the robot arm; a first control section configured to execute control processing for controlling operation of the robot arm; and a second control section provided independently from the first control section and configured to transmit a position information request signal for requesting the position information to the encoders. The second control section transmits an interrupt signal to the first control section according to the transmission of the position information request signal. The first control section executes the control processing based on the interrupt signal and the position information output from the encoders based on the position information request signal.

A control method for a robot system according to an application example of the present disclosure is a control method for a robot system including: a robot arm; encoders configured to acquire position information of the robot arm; a first control section configured to execute control processing for controlling operation of the robot arm; and a second control section provided independently from the first control section and configured to transmit a position information request signal for requesting the position information to the encoders. The control method includes: transmitting, with the second control section, the position information request signal to the encoders and transmitting, with the second control section, an interrupt signal corresponding to the position information request signal to the first control section; and executing the control processing based on the interrupt signal and the position information output from the encoders based on the position information request signal.

BRIEF DESCRIPTION OF THE DRAWINGS

FIG. 2 is a block diagram of the robot system shown in FIG. 1.

FIG. 3 is a diagram showing an example of processing allocated to cores shown in FIG. 2.

FIG. 5 is a timing chart in which flows of signals and data between a control device and a robot in related art are summarized along an elapsed time.

FIG. 6 is a schematic diagram for explaining an abnormality detecting function of a first control section.

FIG. 7 is a table showing an example of a first control section side axis number and an example of a second control section side axis number corresponding to an interrupt signal received by the first control section.

DESCRIPTION OF EXEMPLARY EMBODIMENTS

Preferred embodiments of a robot system and a control method for the robot system according to the present disclosure are explained in detail below with reference to the accompanying drawings.

1. First Embodiment

First, a robot system according to a first embodiment is explained.

Figure 1:
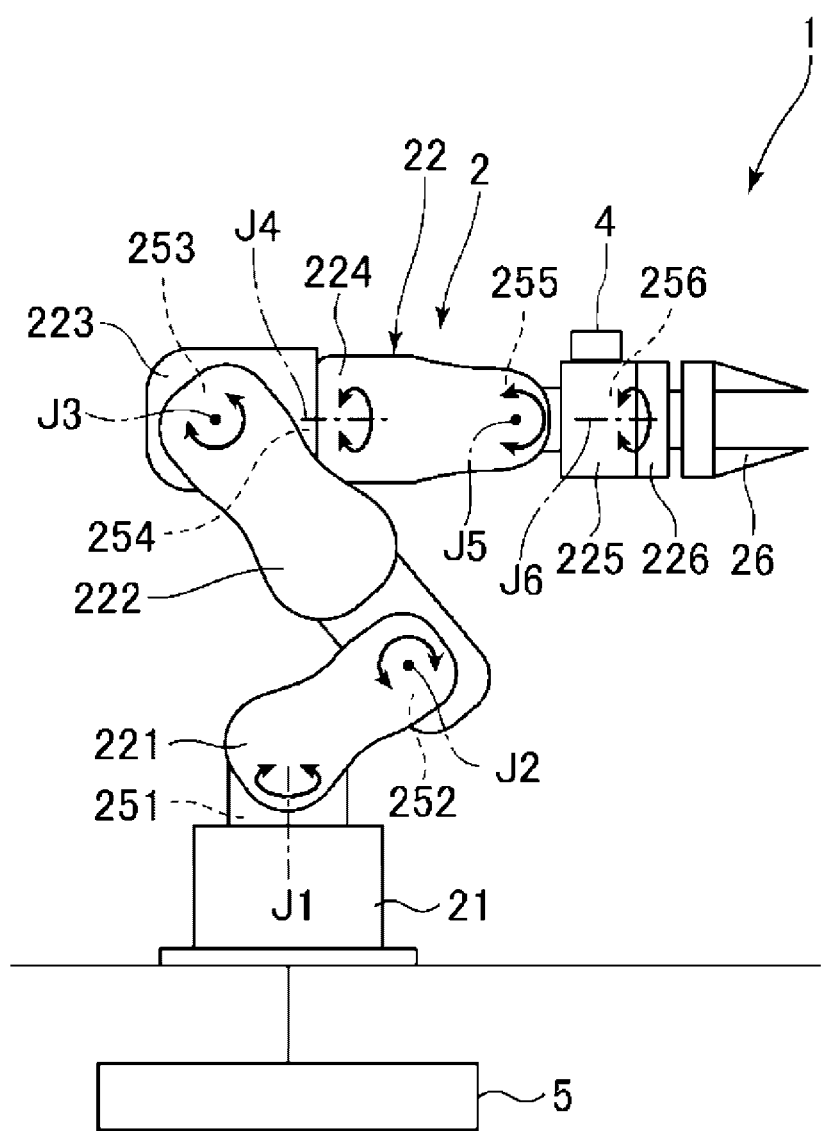
FIG. 1 is a side view showing a robot system according to a first embodiment.

FIG. 1 is a side view showing the robot system according to the first embodiment. FIG. 2 is a block diagram of the robot system shown in FIG. 1.

1.1 Overview of the Robot System

A robot system 1 shown in FIG. 1 includes a robot 2 and a control device 5 that controls the operation of the robot 2. Uses of the robot system 1 are not particularly limited. Examples of the uses of the robot system 1 include supply, removal, conveyance, and assembly of a precision instrument and components configuring the precision instrument.

The robot 2 shown in FIG. 1 includes a base 21, a robot arm 22 coupled to the base 21, and an imaging section 4 provided in the robot arm 22.

The base 21 is fixed to an installation part such as a floor, a wall, a ceiling, or a movable truck.

The robot arm 22 includes an arm 221 coupled to the base 21 to be capable of turning around a first axis J1, an arm 222 coupled to the arm 221 to be capable of turning around a second axis J2, an arm 223 coupled to the arm 222 to be capable of turning around a third axis J3, an arm 224 coupled to the arm 223 to be capable of turning around a fourth axis J4, an arm 225 coupled to the arm 224 to be capable of turning around a fifth axis J5, and an arm 226 coupled to the arm 225 to be capable of turning around a sixth axis J6. An end effector 26 corresponding to work to be executed by the robot 2 is attached to the arm 226.

The configuration of the robot 2 is not limited to the configuration in this embodiment. For example, the number of arms of the robot arm 22 may be one to five or may be seven or more. A type of the robot 2 may be a SCARA robot or a double-arm robot including two robot arms 22.

The robot 2 includes, as shown in FIG. 2, a first driving section 231, a second driving section 232, a third driving section 233, a fourth driving section 234, a fifth driving section 235, and a sixth driving section 236. The first driving section 231 includes a not-shown motor that turns the arm 221 with respect to the base 21 and a not-shown speed reducer. The second driving section 232 includes a not-shown motor that turns the arm 222 with respect to the arm 221 and a not-shown speed reducer. The third driving section 233 includes a not-shown motor that turns the arm 223 with respect to the arm 222 and a not-shown speed reducer. The fourth driving section 234 includes a not-shown motor that turns the arm 224 with respect to the arm 223 and a not-shown speed reducer. The fifth driving section 235 includes a not-shown motor that turns the arm 225 with respect to the arm 224 and a not-shown speed reducer. The sixth driving section 236 includes a not-shown motor that turns the arm 226 with respect to the arm 225 and a not-shown speed reducer.

The control device 5 controls the operations of the first driving section 231, the second driving section 232, the third driving section 233, the fourth driving section 234, the fifth driving section 235, and the sixth driving section 236 to move the arms 221 to 226 to target positions.

The robot 2 includes encoders 24 that are provided in rotating shafts of the motors or the speed reducers of the driving sections and detect rotation angles of the rotating shafts. The encoders 24 acquire position information of the robot arm 22. The position information means information indicating rotation angles of the rotating shafts. The encoders 24 have a function of transmitting the acquired position information to the control device 5 for each of the rotating shafts.

In the robot 2 according to this embodiment, the encoders 24 are multiplexed. The multiplexing means making it possible to acquire a plurality of kinds of position information by providing a plurality of encoders for each of the rotating shafts. Therefore, it is possible to impart redundancy to the encoders 24 and more highly accurately detect the positions and the speeds of the rotating shafts.

Specifically, the encoders 24 include a first main encoder 241*a*, a first sub-encoder 241*b*, a second main encoder 242*a*, a second sub-encoder 242*b*, a third main encoder 243*a*, a third sub-encoder 243*b*, a fourth main encoder 244*a*, a fourth sub-encoder 244*b*, a fifth main encoder 245*a*, a fifth sub-encoder 245*b*, a sixth main encoder 246*a*, and a sixth sub-encoder 246*b*.

The first main encoder 241*a* and the first sub-encoder 241*b* that detect a rotation angle of the rotating shaft of the motor or the speed reducer of the first driving section 231 are provided in the motor or the speed reducer. The second main encoder 242*a* and the second sub-encoder 242*b* that detect a rotation angle of the rotating shaft of the motor or the speed reducer of the second driving section 232 are provided in the motor or the speed reducer. The third main encoder 243*a* and the third sub-encoder 243*b* that detect a rotation angle of the rotating shaft of the motor or the speed reducer of the third driving section 233 are provided in the motor or the speed reducer. The fourth main encoder 244*a* and the fourth sub-encoder 244*b* that detect a rotation angle of the rotating shaft of the motor or the speed reducer of the fourth driving section 234 are provided in the motor or the speed reducer. The fifth main encoder 245*a* and the fifth sub-encoder 245*b* that detect a rotation angle of the rotating shaft of the motor or the speed reducer of the fifth driving section 235 are provided in the motor or the speed reducer. The sixth main encoder 246*a* and the sixth sub-encoder 246*b* that detect a rotation angle of the rotating shaft of the motor or the speed reducer of the sixth driving section 236 are provided in the motor or the speed reducer.

Examples of the motors include an AC servomotor and a DC servomotor. Examples of the speed reducers include a planetary gear-type speed reducer and a wave gear device.

The motors are electrically coupled to the control device 5 via not-shown motor drivers. The encoders 24 are also electrically coupled to the control device 5.

The imaging section 4 is attached to the robot arm 22 and images a target of work by the robot 2 and the end effector 26. The imaging section 4 is electrically coupled to the control device 5.

1.2. Hardware Configuration of the Control Device

The control device 5 is communicably coupled to the robot 2. The control device 5 and the robot 2 may be coupled by wire or may be coupled by radio.

The control device 5 includes a first control section 51, a second control section 52, a system bus 53, and a main memory 54.

The first control section 51 includes a processor such as a CPU (Central Processing Unit) or an MPU (Micro Processing Unit). The processor may be a single-core processor that operates in a multi-task manner. However, the processor is preferably a multi-core processor. By using the multi-core processor, execution of different application programs can be allocated to cores. Consequently, it is possible to smoothly execute the application programs and improve performance, in particular, real-time properties of the control device 5.

The first control section 51 shown in FIG. 2 includes a multi-core processor. The processor includes a first core 511, a second core 512, a third core 513, and a fourth core 514. The number of cores of the processor is not limited to four.

FIG. 3 is a diagram showing an example of processing allocated to the cores shown in FIG. 2. The example shown in FIG. 3 is an example in which the multi-core processor used in the first control section 51 is operated by asymmetrical multiprocessing (AMP). The asymmetrical multiprocessing is a technique for mixing different OSs (Operating Systems) and bare metals on one processor.

Control processing for the robot 2 including robot arm control processing for controlling the operation of the robot arm 22 is allocated to the first core 511.

Image processing is allocated to the second core 512 and the third core 513. Examples of the image processing include imaging processing by the imaging section 4 and filter processing for an obtained image.

A general-purpose OS such as Linux (registered trademark) is allocated to the first core 511, the second core 512, and the third corer 513. Consequently, it is possible to cause the first core 511, the second core 512, and the third core 513 to execute various kinds of general-purpose processing including the processing described above. Examples of the general-purpose processing include, besides the image processing, arithmetic operation processing for outputs of a force sensor, a pressure sensor, and a proximity sensor.

For example, processing concerning an operation position of the robot arm 22, processing concerning operating speed of the robot arm 22, processing concerning communication with the second control section 52, and processing concerning other communication are allocated to the fourth core 514. These kinds of processing are respectively processing requested to be executed at a predetermined time interval. Therefore, the processing is referred to as "predetermined interval processing" herein. Examples of the other communication include processing concerning a field bus and processing concerning a standard input and output. The predetermined time interval is not particularly limited but is set to, for example, several ten microseconds to several milliseconds.

The fourth core 514 is a so-called bare metal to which, for example, an OS is not allocated. The bare metal is also called bare metal-type hypervisor and means a virtual environment that makes it possible to directly execute an application program on hardware not via an OS or virtual software for constructing the virtual environment. By forming the fourth core 514 as the bare metal, it is easier to execute the predetermined interval processing without delay compared with when the general-purpose OS is allocated to the fourth core 514. That is, it is possible to improve the real-time properties. The fourth core 514 is not limited to the bare metal. For example, any OS may be allocated to the fourth core 514.

The first control section 51 may include not-shown primary cache memories respectively corresponding to the first core 511, the second core 512, the third core 513, and the fourth core 514.

On the other hand, the first control section 51 shown in FIG. 2 includes a secondary cache memory 515 common to the first core 511, the second core 512, the third core 513, and the fourth core 514.

The cores and the cores and the secondary cache memory 515 are communicably coupled via not-shown interconnects.

The first control section 51 may include a not-shown system timer and the like besides the cache memories.

A hardware configuration of the first control section 51 may be a configuration in which the sections explained above are physically independent from one another but is preferably a configuration in which the sections are integrated in one chip. Specifically, the hardware configuration of the first control section 51 is preferably an SoC (System On Chip). Consequently, it is possible to realize a reduction in the size, power saving, and a reduction in the cost of the first control section 51.

The second control section 52 includes elements such as an FPGA (Field-Programmable Gate Array) and an ASIC (Application Specific Integrated Circuit). The second control section 52 has a function of generating a timing signal at a predetermined time interval, a function of generating an interrupt signal simultaneously with the timing signal generation and transmitting the interrupt signal to the first control section 51, and a function of generating a position information request signal simultaneously with the timing signal generation and transmitting the position information request signal to the encoders 24.

The second control section 52 is communicably coupled to the first control section 51 via the system bus 53 shown in FIG. 2.

The main memory 54 is communicably coupled to the system bus 53. Examples of the main memory 54 include a RAM (Random Access Memory). Besides, not-shown various interfaces, a not-shown nonvolatile memory, a not-shown communication controller, and the like may be communicably coupled to the system bus 53. The system bus 53 may be independently configured as a first dedicated bus that couples the first control section 51 and the second control section 52 and a second dedicated bus that couples the first control section 51 and the main memory 54.

1.3. Software Configuration of the Control Device

A software configuration of the control device 5, that is, an operation example of the control device 5 is explained. In the following explanation, signals and data transmitted and received between the control device 5 and the robot 2 are explained taking, as an example, a process in which the control device 5 acquires position information and speed information from the encoders 24.

Figure 4:
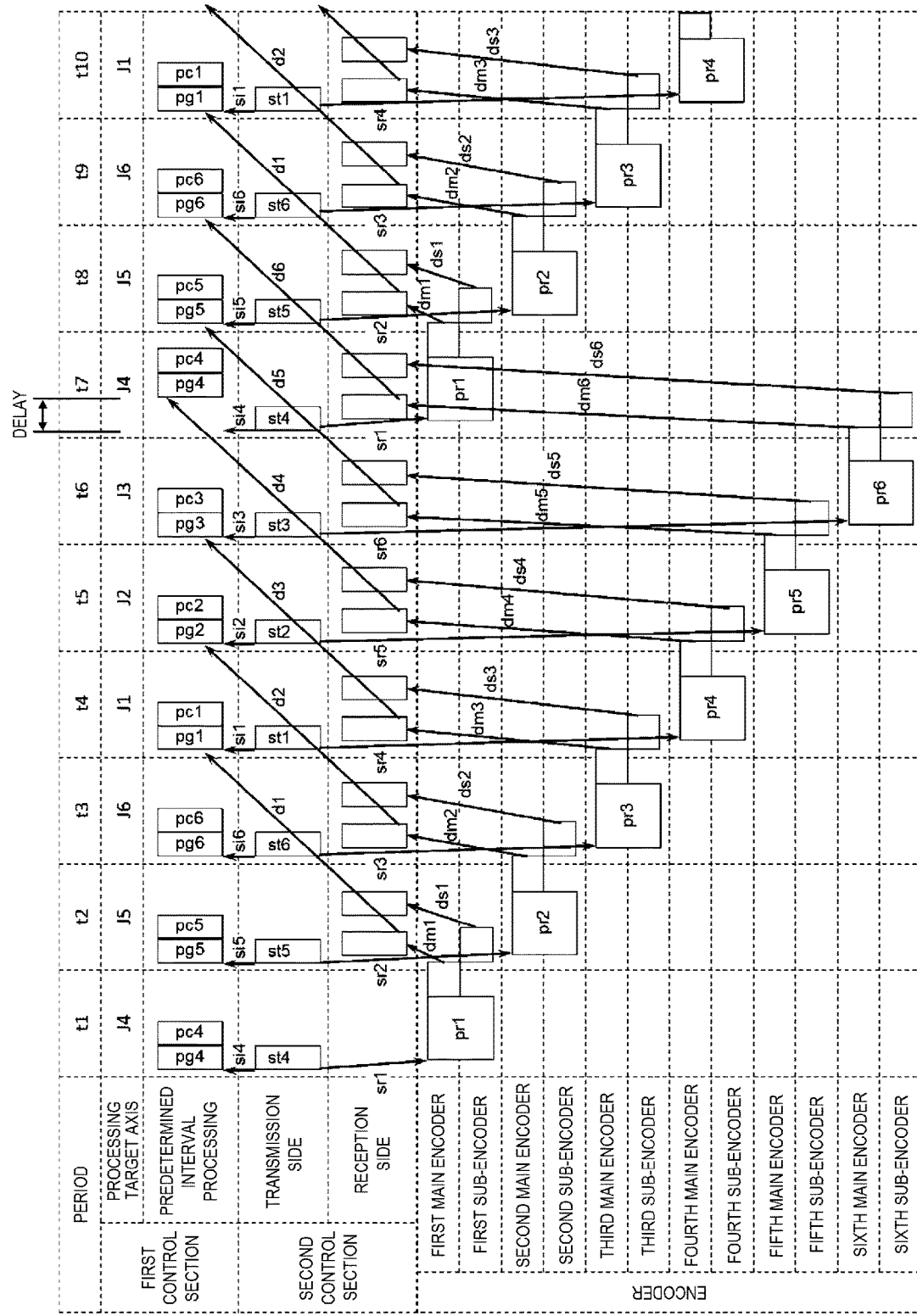
FIG. 4 is a timing chart in which flows of signals and data between a control device and a robot shown in FIG. 2 are summarized along an elapsed time.

FIG. 4 is a timing chart in which flows of signals and data between the control device 5 and the robot 2 shown in FIG. 2 are summarized along an elapsed time. In FIG. 4, arrows indicate the flows of the signals and the data. Solid line squares indicate processing, operations, or transmission and reception of signals. The arrows connect the solid line squares.

The horizontal axis of FIG. 4 is a time axis. Time flows from the left to the right. In FIG. 4, a first period is represented as a period t1 and the next period is represented as a period t2. A period t3, a period t4, . . . follow thereafter. The lengths of the periods are equal to one another. A processing target axis shown in FIG. 4 indicates a target axis of processing concerning position information executed in a time division manner by the fourth core 514 of the first control section 51. Specifically, the processing target axis indicates which of the first axis J1, the second axis J2, the third axis J3, the fourth axis J4, the fifth axis J5, and the sixth axis J6 the target axis of the processing of the position information by the fourth core 514 of the first control section 51 is in the periods. The first to sixth axes J1 to J6 are set in order as the processing target axis. The setting of the first to sixth axes J1 to J6 is repeated.

The sections of the control device 5 or the robot 2 are enumerated on the vertical axis of FIG. 4. Start points and end points of the arrows are respectively located in any one of the sections shown on the vertical axis of FIG. 4. A transmission side of the second control section 52 shown in FIG. 4 indicates, in the second control section 52, regions for transmitting signals to the sections. A reception side of the second control section 52 shown in FIG. 4 indicates, in the second control section 52, regions for receiving data of position information from the encoders 24 and transmitting the data to the first control section 51.

1.3.1. Period t1

In the first period t1 shown in FIG. 4, an interrupt signal si4 is transmitted from the second control section 52 to the first control section 51 based on one timing signal st4 generated by the second control section 52.

The fourth core 514 of the first control section 51 receives the interrupt signal si4 and executes, with the reception of the interrupt signal si4 as a trigger, processing concerning the position of the fourth axis J4. This processing includes acquisition processing pg4 for acquiring not-shown position information concerning the fourth axis J4 transmitted from the second control section 52 in a period before the period t1 and arithmetic operation processing pc4 for calculating a position and speed of the fourth axis J4 from the position information. The position of the fourth axis J4, that is, a turning angle from the origin of the fourth axis J4 is obtained by these kinds of processing. Turning speed of the fourth axis J4 is obtained based on an amount of change per unit time of the calculated position. Details of the processing are explained below.

On the other hand, in the period t1, a position information request signal sr1 is transmitted from the second control section 52 to the first main encoder 241*a* and the first sub-encoder 241*b* based on one timing signal st4 generated by the second control section 52.

The first main encoder 241*a* and the first sub-encoder 241*b* respectively receive the position information request signal sr1 and perform, with the reception of the position information request signal sr1 as a trigger, a position detecting operation pr1 for detecting the position of the first axis J1. Subsequently, the first main encoder 241*a* and the first sub-encoder 241*b* transmit, in order, to the second control section 52, first main position information dm1 and first sub-position information ds1, which are information concerning the position of the first axis J1 acquired by the position detecting operation pr1.

The second control section 52 receives the first main position information dm1 and the first sub-position information ds1 and integrates these kinds of information. The second control section 52 saves the integrated information in, for example, the secondary cache memory 515 as first position information d1 concerning the position and the status of the first axis J1. The first control section 51 reads out the first position information d1.

The transmission and reception of the various signals and the data do not need to be performed in the period t1 and may be performed in a period after the period t1. In FIG. 4, as an example, the transmission of the first main position information dm1 and the first sub-position information ds1 and the readout of the first position information d1 are respectively performed in the period t2.

The first position information d1 may be saved in the secondary cache memory 515 or may be saved in a not-shown storing section included in the second control section 52. The same applies to second position information d2 and subsequent position information explained below.

1.3.2. Period t2

In the period t2 shown in FIG. 4, an interrupt signal si5 is transmitted from the second control section 52 to the first control section 51 based on a timing signal sty generated by the second control section 52.

The fourth core 514 of the first control section 51 receives the interrupt signal si5 and executes, with the reception of the interrupt signal si5 as a trigger, processing concerning the position of the fifth axis J5. This processing includes acquisition processing pg5 for acquiring not-shown position information concerning the fifth axis J5 transmitted from the second control section 52 in a period before the period t2 and arithmetic operation processing pc5 for calculating a position and speed of the fifth axis J5 from the position information. The position of the fifth axis J5, that is, a turning angle from the origin of the fifth axis J5 is obtained by these kinds of processing. Turning speed of the fifth axis J5 is obtained based on an amount of change per unit time of the calculated position. Details of the processing are explained below.

On the other hand, in the period t2, a position information request signal sr2 is transmitted from the second control section 52 to the second main encoder 242*a* and the second sub-encoder 242*b* based on the timing signal sty generated by the second control section 52.

The second main encoder 242*a* and the second sub-encoder 242*b* respectively receive the position information request signal sr2 and perform, with the reception of the position information request signal sr2 as a trigger, a position detecting operation pr2 for detecting the position of the second axis J2. Subsequently, the second main encoder 242*a* and the second sub-encoder 242*b* transmit, in order, to the second control section 52, second main position information dm2 and second sub-position information ds2, which are information concerning the position of the second axis J2 acquired by the position detecting operation pr2.

The second control section 52 receives the second main position information dm2 and the second sub-position information ds2 and integrates these kinds of information. The second control section 52 saves the integrated information in, for example, the secondary cache memory 515 as second position information d2 concerning the position and the status of the second axis J2. The first control section 51 reads out the second position information d2.

The transmission and reception of the various signals and the data do not need to be performed in the period t2 and may be performed in a period after the period t2. In FIG. 4, as an example, the transmission of the second main position information dm2 and the second sub-position information ds2 and the readout of the second position information d2 are respectively performed in the period t3.

1.3.3. Period t3

In the period t3 shown in FIG. 4, an interrupt signal si6 is transmitted from the second control section 52 to the first control section 51 based on a timing signal st6 generated by the second control section 52.

The fourth core 514 of the first control section 51 receives the interrupt signal si6 and executes, with the reception of the interrupt signal si6 as a trigger, processing concerning the position of the sixth axis J6. This processing includes acquisition processing pg6 for acquiring not-shown position information concerning the sixth axis J6 transmitted from the second control section 52 in a period before the period t3 and arithmetic operation processing pc6 for calculating a position and speed of the sixth axis J6 from the position information. The position of the sixth axis J6, that is, a turning angle from the origin of the sixth axis J6 is obtained by these kinds of processing. Turning speed of the sixth axis J6 is obtained based on an amount of change per unit time of the calculated position. Details of the processing are explained below.

On the other hand, in the period t3, a position information request signal sr3 is transmitted from the second control section 52 to the third main encoder 243*a* and the third sub-encoder 243*b* based on the timing signal st6 generated by the second control section 52.

The third main encoder 243*a* and the third sub-encoder 243*b* respectively receive the position information request signal sr3 and perform, with the reception of the position information request signal sr3 as a trigger, a position detecting operation pr3 for detecting the position of the third axis J3. Subsequently, the third main encoder 243*a* and the third sub-encoder 243*b* transmit, in order, to the second control section 52, third main position information dm3 and third sub-position information ds3, which are information concerning the position of the third axis J3 acquired by the position detecting operation pr3.

The second control section 52 receives the third main position information dm3 and the third sub-position information ds3 and integrates these kinds of information. The second control section 52 saves the integrated information in, for example, the secondary cache memory 515 as third position information d3 concerning the position and the status of the third axis J3. The first control section 51 reads out the third position information d3.

The transmission and reception of the various signals and the data do not need to be performed in the period t3 and may be performed in a period after the period t3. In FIG. 4, as an example, the transmission of the third main position information dm3 and the third sub-position information ds3 and the readout of the third position information d3 are respectively performed in the period t4.

1.3.4. Period t4

In the period t4 shown in FIG. 4, an interrupt signal si1 is transmitted from the second control section 52 to the first control section 51 based on a timing signal st1 generated by the second control section 52.

The fourth core 514 of the first control section 51 receives the interrupt signal si1 and executes, with the reception of the interrupt signal si1 as a trigger, processing concerning the position of the first axis J1. This processing includes acquisition processing pg1 for acquiring the first position information d1 concerning the first axis J1 transmitted from the second control section 52 in the period t1 and arithmetic operation processing pc1 for calculating a position and speed of the first axis J1 from the position information. The position of the first axis J1, that is, a turning angle from the origin of the first axis J1 is obtained by these kinds of processing. Turning speed of the first axis J1 is obtained based on an amount of change per unit time of the calculated position.

In the fourth core 514, when the acquisition processing pg1 and the arithmetic operation processing pc1 are executed, timing for the execution is determined based on the interrupt signal si1 as explained above. Timing when the first position information d1 used for these kinds of processing is transmitted to the first control section 51 is determined based on the position information request signal sr1 transmitted from the second control section 52 in the period t1 explained above.

Therefore, the interrupt signal si1 is transmitted based on the timing signal st1. The position information request signal sr1 is transmitted based on the timing signal st4 in the period t1. The timing signals st1 and st4 are accurately generated at a predetermined interval in the second control section 52 independent from the first control section 51. Consequently, the first position information d1 saved in the secondary cache memory 515 according to the position information request signal sr1 can be read out by the first control section 51 in the period t4. In other words, by optimizing transmission timings of the signals using the highly accurate timing signals st1 and st4, immediately before starting the acquisition processing pg1 and the arithmetic operation processing pc1, the first control section 51 is capable of reading the first position information d1 necessary for the processing. Consequently, it is unnecessary to separately prepare processing for synchronizing timings of the processing. It is possible to achieve simplification of the configuration of the control device 5.

On the other hand, in the period t4, a position information request signal sr4 is transmitted from the second control section 52 to the fourth main encoder 244a and the fourth sub-encoder 244b based on the timing signal st1 generated by the second control section 52.

The fourth main encoder 244a and the fourth sub-encoder 244b respectively receive the position information request signal sr4 and perform, with the reception of the position information request signal sr4 as a trigger, a position detecting operation pr4 for detecting the position of the fourth axis J4. Subsequently, the fourth main encoder 244a and the fourth sub-encoder 244b transmit, in order, to the second control section 52, fourth main position information dm4 and fourth sub-position information ds4, which are information concerning the position of the fourth axis J4 acquired by the position detecting operation pr4.

The second control section 52 receives the fourth main position information dm4 and the fourth sub-position information ds4 and integrates these kinds of information. The second control section 52 saves the integrated information in, for example, the secondary cache memory 515 as fourth position information d4 concerning the position and the status of the fourth axis J4. The first control section 51 reads out the fourth position information d4.

The transmission and reception of the various signals and the data do not need to be performed in the period t4 and may be performed in a period after the period t4. In FIG. 4, as an example, the transmission of the fourth main position information dm4 and the fourth sub-position information ds4 and the readout of the fourth position information d4 are respectively performed in the period t5.

1.3.5. Period t5

In the period t5 shown in FIG. 4, an interrupt signal si2 is transmitted from the second control section 52 to the first control section 51 based on a timing signal st2 generated by the second control section 52.

The fourth core 514 of the first control section 51 receives the interrupt signal si2 and executes, with the reception of the interrupt signal si2 as a trigger, processing concerning the position of the second axis J2. This processing includes acquisition processing pg2 for acquiring the second position information d2 concerning the second axis J2 transmitted from the second control section 52 in the period t2 and arithmetic operation processing pc2 for calculating a position and speed of the second axis J2 from the position information. The position of the second axis J2, that is, a turning angle from the origin of the second axis J2 is obtained by these kinds of processing. Turning speed of the second axis J2 is obtained based on an amount of change per unit time of the calculated position.

In the fourth core 514, when the acquisition processing pg2 and the arithmetic operation processing pc2 are executed, timing for the execution is determined based on the interrupt signal si2 as explained above. Timing when the second position information d2 used for these kinds of processing is transmitted to the first control section 51 is determined based on the position information request signal sr2 transmitted from the second control section 52 in the period t2 explained above.

Therefore, the interrupt signal si2 is transmitted based on the timing signal st2. The position information request signal sr2 is transmitted based on the timing signal st5 in the period t2. The timing signals st2 and st5 are accurately generated at a predetermined interval in the second control section 52 independent from the first control section 51. Consequently, the second position information d2 saved in the secondary cache memory 515 according to the position information request signal sr2 can be read out by the first control section 51 in the period t5. In other words, by optimizing transmission timings of the signals using the highly accurate timing signals st2 and st5, immediately before starting the acquisition processing pg2 and the arithmetic operation processing pc2, the first control section 51 is capable of reading the second position information d2 necessary for the processing. Consequently, it is unnecessary to separately prepare processing for synchronizing both timings of the processing. It is possible to achieve simplification of the configuration of the control device 5.

On the other hand, in the period t5, a position information request signal sr5 is transmitted from the second control section 52 to the fifth main encoder 245a and the fifth sub-encoder 245b based on the timing signal st2 generated by the second control section 52.

The fifth main encoder 245a and the fifth sub-encoder 245b respectively receive the position information request signal sr5 and perform, with the reception of the position information request signal sr5 as a trigger, a position detecting operation pr5 for detecting the position of the fifth axis J5. Subsequently, the fifth main encoder 245a and the fifth sub-encoder 245b transmit, in order, to the second control section 52, fifth main position information dm5 and fifth sub-position information ds5, which are information concerning the position of the fifth axis J5 acquired by the position detecting operation pr5.

The second control section 52 receives the fifth main position information dm5 and the fifth sub-position information ds5 and integrates these kinds of information. The second control section 52 saves the integrated information in, for example, the secondary cache memory 515 as fifth position information d5 concerning the position and the status of the fifth axis J5. The first control section 51 reads out the fifth position information d5.

The transmission and reception of the various signals and the data do not need to be performed in the period t5 and may be performed in a period after the period t5. In FIG. 4, as an example, the transmission of the fifth main position information dm5 and the fifth sub-position information ds5 and the readout of the fifth position information d5 are respectively performed in the period t6.

1.3.6. Period t6

In the period t6 shown in FIG. 4, an interrupt signal si3 is transmitted from the second control section 52 to the first control section 51 based on a timing signal st3 generated by the second control section 52.

The fourth core 514 of the first control section 51 receives the interrupt signal si3 and executes, with the reception of the interrupt signal si3 as a trigger, processing concerning the position of the third axis J3. This processing includes acquisition processing pg3 for acquiring the third position information d3 concerning the third axis J3 transmitted from the second control section 52 in the period t3 and arithmetic operation processing pc3 for calculating a position and speed of the third axis J3 from the position information. The position of the third axis J3, that is, a turning angle from the origin of the third axis J3 is obtained by these kinds of processing. Turning speed of the third axis J3 is obtained based on an amount of change per unit time of the calculated position.

In the fourth core 514, when the acquisition processing pg3 and the arithmetic operation processing pc3 are executed, timing for the execution is determined based on the interrupt signal si3 as explained above. On the other hand, timing when the third position information d3 used for these kinds of processing is transmitted to the first control section 51 is determined based on the position information request signal sr3 transmitted from the second control section 52 in the period t3 explained above.

Therefore, the interrupt signal si3 is transmitted based on the timing signal st3. The position information request signal sr3 is transmitted based on the timing signal st6 in the period t3. The timing signals st3 and st6 are accurately generated at a predetermined interval in the second control section 52 independent from the first control section 51. Consequently, the third position information d3 saved in the secondary cache memory 515 according to the position information request signal sr3 can be read out by the first control section 51 in the period t6. In other words, by optimizing transmission timings of the signals using the highly accurate timing signals st3 and st6, immediately before starting the acquisition processing pg3 and the arithmetic operation processing pc3, the first control section 51 is capable of reading the third position information d3 necessary for the processing. Consequently, it is unnecessary to separately prepare processing for synchronizing both timings of the processing. It is possible to achieve simplification of the configuration of the control device 5.

On the other hand, in the period t6, a position information request signal sr6 is transmitted from the second control section 52 to the sixth main encoder 246a and the sixth sub-encoder 246b based on the timing signal st3 generated by the second control section 52.

The sixth main encoder 246a and the sixth sub-encoder 246b respectively receive the position information request signal sr6 and perform, with the reception of the position information request signal sr6 as a trigger, a position detecting operation pr6 for detecting the position of the sixth axis J6. Subsequently, the sixth main encoder 246a and the sixth sub-encoder 246b transmit, in order, to the second control section 52, sixth main position information dm6 and sixth sub-position information ds6, which are information concerning the position of the sixth axis J6 acquired by the position detecting operation pr6.

The second control section 52 receives the sixth main position information dm6 and the sixth sub-position information ds6 and integrates these kinds of information. The second control section 52 saves the integrated information in, for example, the secondary cache memory 515 as sixth position information d6 concerning the position and the status of the sixth axis J6. The first control section 51 reads out the sixth position information d6.

The transmission and reception of the various signals and the data do not need to be performed in the period t6 and may be performed in a period after the period t6. In FIG. 4, as an example, the transmission of the sixth main position information dm6 and the sixth sub-position information ds6 and the readout of the sixth position information d6 are respectively performed in a period t7.

1.3.7. Period t7 and Subsequent Periods

In the period t7 and subsequent periods shown in FIG. 4, specifically, in periods t7 to t10, transmission and reception of signals and data, operations, processing, and the like are repeated as in the periods t1 to t6 explained above. As a result, the control device 5 can acquire positions, speeds, and the like of the first to sixth axes J1 to J6 at a predetermined interval. The control device 5 is capable of appropriately controlling the operation of the robot arm 22 based on the acquired position, speed, and the like.

1.3.8. Comparison With Related Art

Differences between related art and this embodiment are explained.

FIG. 5 is a timing chart in which flows of signals and data between a control device and a robot in related art are summarized along an elapsed time. The horizontal axis and the vertical axis of FIG. 5 are the same as the horizontal axis and the vertical axis of FIG. 4. For convenience of explanation, the same components as the components shown in FIG. 4 are denoted by the same reference numerals and signs.

In FIG. 4 referred to above, the position information request signals sr1, sr2, sr3, sr4, . . . are transmitted from the second control section 52 based on the timing signals st4, st5, st6, st1, . . . generated by the second control section 52. A generation period of the timing signals st4, st5, st6, st1, . . . is not particularly limited. For example, the generation period is several ten microseconds.

On the other hand, in FIG. 5 showing related art, control signals sc4', sc5', sc6', sc1', concerning acquisition of position information are transmitted from the first control section 51 instead of these timing signals. The second control section 52, which receives the control signals, transmits position information request signals sr1', sr2', sr3', sr4', . . . to the encoders 24.

That is, in FIG. 4 referred to above, the timing signals st4, sty, st6, st1, . . . are generated from the second control section 52. The position information request signals sr1, sr2, sr3, sr4, . . . are transmitted from the second control section 52 based on the timing signals. On the other hand, in FIG. 5 showing related art, the control signals sc4', sc5', sc6', sc1', . . . are transmitted from the first control section 51 to the second control section 52. The position information request signals sr1', sr2', sr3', sr4', . . . are transmitted from the second control section 52 based on the control signals.

In this case, a transmission interval of the position information request signals sr1', sr2', sr3', sr4', . . . depends on a transmission interval of the control signals sc4', sc5', sc6', sc1', . . . .

Transmission of the control signals sc4', sc5', sc6', sc1', . . . in the first control section 51 is performed based on the predetermined interval processing in the fourth core 514. It is assumed that the predetermined interval processing for transmitting the control signals sc4', sc5', sc6', sc1', . . . is executed immediately before the acquisition processing pg4, pg5, pg6, pg1, . . . .

However, in the first control section 51, general-purpose processing such as image processing is sometimes executed in parallel to the predetermined interval processing. Such general-purpose processing temporarily occupies the secondary cache memory 515 and the system bus 53 of the first control section 51. Then, a program necessary for the predetermined interval processing is evicted from the secondary cache memory 515. A delay occurs in timing for starting the predetermined interval processing. This is a problem in related art. This problem is more specifically explained below.

In FIG. 5 showing related art, an example is shown in which a start of the predetermined interval processing for transmitting the control signal sc4' is delayed in the period t7. When the transmission of the control signal sc4' is delayed, timing for transmitting the position information request signal sr1' from the second control section 52 is also delayed. Then, a start of the position detecting operation pr1 for detecting the position of the first axis J1 is also delayed. Transmission of the first main position information dm1 and the first sub-position information ds1 and transmission of the first position information d1 are respectively also delayed. In FIG. 5, for convenience of explanation, the predetermined interval processing in the period t7, the start of which is delayed, is indicated by dots. Processing and operation affected by the delay are also indicated by dots.

On the other hand, an example is shown in which, in the period t8 in FIG. 5, the predetermined interval processing for transmitting the control signal sc5' is started at timing assumed in the beginning. Then, timing for transmitting the position information request signal sr2' from the second control section 52 is also as assumed. Timing for starting the position detecting operation pr2 for detecting the position of the second axis J2 is also as assumed. Transmission of the second main position information dm2 and the second sub-position information ds2 and transmission of the second position information d2 are also performed at timing as assumed in the beginning.

As a result of the above, in the second control section 52, as shown in FIG. 5, for example, a period in which the first sub-position information ds1 is received and a period in which the second main position information dm2 is received overlap. Consequently, crosstalk of data occurs in the second control section 52. Normal data cannot be obtained. As a result, accurate positions and speeds cannot be acquired about the first axis J1 and the second axis J2.

The first control section 51 calculates speeds from the positions of the axes based on the premise that the position detecting operations pr1, pr2, pr3, pr4, . . . are executed at a predetermined time interval. However, as shown in FIG. 5, when the transmission of the control signal sc4' is delayed, a start of the position detecting operation pr1 is delayed. This premise is broken. Consequently, accuracy of calculated speed is also deteriorated.

On the other hand, in FIG. 4 showing this embodiment, the position information request signals sr1, sr2, sr3, sr4, . . . are transmitted from the second control section 52 based on the timing signals st4, st5, st6, st1, . . . generated by the second control section 52. The timing signals st4, st5, st6, and st1, . . . are signals generated from the second control section 52 independent from the first control section 51. Therefore, a generation interval of the timing signals st4, st5, st6, st1, . . . is maintained at a predetermined interval irrespective of a state of the first control section 51. That is, in the first control section 51, even when the secondary cache memory 515 and the system bus 53 are occupied by image processing or the like, the generation interval of the timing signals st4, st5, st6, st1, . . . is not affected by the occupation. Therefore, the transmission of the position information request signals sr1, sr2, sr3, sr4, . . . transmitted based on the timing signals st4, st5, st6, st1, . . . is not delayed irrespective of the state of the first control section 51. As a result, occurrence of crosstalk of data is prevented and the premise is maintained. Therefore, the control device 5 can acquire accurate positions and speeds.

However, in this embodiment as well, a delay of the predetermined interval processing could occur when the secondary cache memory 515 of the first control section 51 and the system bus 53 are occupied by the general-purpose processing. In FIG. 4, an example is shown in which starts of the acquisition processing pg4 and the arithmetic operation processing pc4 are delayed in the period t7. In FIG. 4, for convenience of explanation, processing, the starts of which are delayed, is indicated by dots.

However, in this embodiment, even if such a delay of the predetermined interval processing occurs, the transmission of the position information request signal sr1 is not delayed. Accordingly, crosstalk of data is not caused. In the period t10, the first control section 51 can acquire normal first position information d1. Since the transmission of the position information request signal sr1 is not delayed, acquisition of normal speed is guaranteed in the control device 5.

The control device 5 can execute control processing for accurately controlling the operation of the robot arm 22 based on the positions and the speeds of the axes acquired in this way.

As explained above, the robot system 1 according to this embodiment includes the robot arm 22, the encoders 24 that acquire position information of the robot arm 22, the first control section 51 that executes control processing for controlling the operation of the robot arm 22, and the second control section 52 that is provided independently from the first control section 51 and transmits the position information request signals sr1, sr2, sr3, sr4, . . . for requesting position information to the encoders 24. The second control section 52 transmits the interrupt signal si4, si5, si6, si1, . . . to the first control section 51 according to the transmission of the position information request signals sr1, sr2, sr3, sr4, . . . . The first control section 51 executes the control processing based on the interrupt signals si4, si5, si6, si1, . . . and the position information output from the encoders 24 based on the position information request signals sr1, sr2, sr3, sr4, . . . .

With such a robot system 1, the control device 5 can acquire an accurate position and accurate speed of the robot arm 22. Accordingly, the control device 5 can accurately control the operation of the robot arm 22. That is, in controlling the operation of the robot arm 22 based on the position information acquired from the encoders 24, even when general-purpose processing with a large load such as image processing is executed in the first control section 51, it is possible to realize the robot system 1 capable of suppressing deterioration in operation accuracy.

The second control section 52 being independent from the first control section 51 indicates a state in which the first control section 51 and the second control section 52 do not share a cache memory or a memory replacing the cache memory. Therefore, the first control section 51 and the second control section 52 may be elements separate from each other or may be integrated in one chip.

The robot system 1 shown in FIG. 2 includes the imaging section 4. The first control section 51 is configured to execute image processing for an image acquired by the imaging section 4. Such image processing is processing that occupies the secondary cache memory 515 and the system bus 53 at a high occupancy ratio. The effects explained above are particularly significant in the control device 5 in which such processing is executed.

The encoders 24 shown in FIG. 2 are multiplexed as explained above. Consequently, it is possible to impart redundancy to the encoders 24 and highly accurately detect the positions and the speeds of the rotating shafts obtained based on the position information acquired from the encoders 24.

As explained above, the second control section 52 is configured to repeat the transmission of the position information request signals sr1, sr2, sr3, sr4, . . . at the predetermined interval. If the predetermined interval is known in advance, it is possible to calculate turning speeds of the axes in the first control section 51 based on the position information acquired from the encoders 24. That is, since the turning speeds can be calculated even if time information is not included in the position information, it is possible to achieve simplification of the configuration of the control device 5.

A control method for the robot system 1 according to this embodiment is a method of controlling the robot system 1 including the robot arm 22, the encoders 24 that acquire position information of the robot arm 22, the first control section 51 that executes control processing for controlling the operation of the robot arm 22, and the second control section 52 that is provided independently from the first control section 51 and transmits the position information request signals sr1, sr2, sr3, sr4, . . . for requesting position information to the encoders 24.

The control method includes a step of transmitting, with the second control section 52, the position information request signals sr1, sr2, sr3, sr4, . . . to the encoders 24 and transmitting, with the second control section 52, the interrupt signals si4, si5, si6, si1, . . . corresponding to the position information request signals sr1, sr2, sr3, sr4, . . . to the first control section 51 and a step of executing, with the first control section 51, control processing based on the interrupt signals si4, si5, si6, si1, . . . and position information output from the encoders 24 based on the position information request signals sr1, sr2, sr3, sr4, . . . .

With such a control method, the control device 5 of the robot system 1 can acquire an accurate position and accurate speed of the robot arm 22. Accordingly, the control device 5 can accurately control the operation of the robot arm 22. In controlling the operation of the robot arm 22 based on the position information acquired from the encoders 24, even when general-purpose processing with a large load such as image processing is executed in the first control section 51, it is possible to suppress deterioration in operation accuracy.

The first control section 51 may have an abnormality detecting function of detecting whether the interrupt signals si4, si5, si6, si1, . . . transmitted to the first control section 51 by the second control section 52 are normally transmitted and received.

FIG. 6 is a schematic diagram for explaining the abnormality detecting function of the first control section 51. Specifically, FIG. 6 is a diagram schematically showing a signal waveform of the interrupt signals si4, si5, si6, si1, . . . transmitted from the second control section 52 to the first control section 51 and flows of axial information request signal sa and axial information da.

The first control section 51 receives the interrupt signals si4, si5, si6, si1, . . . generated at a predetermined cycle shown in FIG. 6 and executes, with the reception of the signals as a trigger, the acquisition processing pg4, pg5, pg6, pg1, . . . and the arithmetic operation processing pc4, pc5, pc6, and pc1, . . . explained above. The first control section 51 has a function of counting the number of received interrupt signals and collating the number with a known number of axes to thereby specify information concerning which axis the position information acquired by the first control section 51 in the acquisition processing is. An axis number specified on the inside of the first control section 51 in this way is referred to as "first control section side axis number". For example, the axis number is 1 in the case of the first axis J1 and is 2 in the case of the second axis J2.

On the other hand, separately from the above, the first control section 51 shown in FIG. 6 requests the second control section 52 to transmit information concerning the axes. That is, the first control section 51 has a function of transmitting the axial information request signal sa. The second control section 52 shown in FIG. 6 has a function of returning the axial information da to the first control section 51 based on the axial information request signal sa. For example, the second control section 52 has a function of counting the number of transmitted interrupt signals and collating the number with a known number of axes to thereby specify the axial information da. The second control section 52 returns an axis number specified on the inside of the second control section 52 to the first control section 51 as the axial information da. The transmission of the axial information request signal sa and the return of the axial information da are repeated at a predetermined interval according to the interrupt signals si4, si5, si6, si1, . . . . The axis number based on the axial information da returned from the second control section 52 in this way is referred to as "second control section side axis number" herein.

FIG. 7 is a table showing an example of the first control section side axis number and the second control section side axis number corresponding to the interrupt signals si1, si2, and si3 received by the first control section 51. In FIG. 7, three tables divided into a table at a normal time when the interrupt signals si1, si2, and si3 are normally transmitted and received, a table at a noise occurrence time, and a table at a missing occurrence time are shown.

When receiving the interrupt signals si1, si2, and si3, as explained above, the first control section 51 acquires the first position information d1, the second position information d2, and the third position information d3 through the acquisition processing pg1, pg2, and pg3. Therefore, at the normal time, the first control section side axis number is 1, 2, and 3 and the second control section side axis number is also 1, 2, and 3. As a result, the first control section 51 collates the first control section side axis number and the second control section side axis number and, when the first control section side axis number and the second control section side axis number coincide, detects that transmission and reception of the interrupt signal si4, si5, si6, si1, . . . is normal.

The noise occurrence time is explained. Noise means an abnormal signal that could be misrecognized as the interrupt signals si1, si2, and si3. In the example shown in FIG. 7, an abnormal signal sx is mixed between the interrupt signal si2 and the interrupt signal si3.

When receiving the abnormal signal sx, the first control section 51 misrecognizes the abnormal signal sx as the original interrupt signal si3. Accordingly, the first control section side axis number corresponding to the abnormal signal sx is 3. On the other hand, since the second control section 52 does not transmit the interrupt signal si3 yet at this point in time, the second control section side axis number is still 2. Then, the first control section 51 detects a mismatch of the first control section side axis number and the second control section side axis number. Specifically, a magnitude relation indicating the first control section side axis number>the second control section side axis number is detected. When detecting such a mismatch, the first control section 51 determines that the abnormal signal sx is noise. When determining in this way, the first control section 51 does not perform processing executed with reception of an interrupt signal as a trigger. Consequently, it is possible to avoid starts of acquisition processing and arithmetic operation processing at wrong timings.

The missing occurrence time is explained. Missing means that at least one of the interrupt signals si1, si2, and si3 cannot be received. In FIG. 7, an example is shown in which, although the second control section 52 transmits the interrupt signals si1, si2, and si3, the first control section 51 cannot receive only the interrupt signal si2.

In this case, the first control section side axis number at timing when the interrupt signal si2 is originally received is still 1. On the other hand, since this timing is timing after the second control section 52 transmits the interrupt signal si2, the second control section side axis number is 2.

The first control section side axis number at timing for receiving the interrupt signal si3 is 2. On the other hand, since this timing is timing after the second control section 52 transmits the interrupt signal si3, the second control section side axis number is 3.

Then, the first control section 51 detects mismatch of the first control section side axis number and the second control section side axis number. Specifically, a magnitude relation indicating the first control section side axis number<the second control section side axis number is detected. When detecting such a mismatch, the first control section 51 determines that missing of the interrupt signal si2 has occurred. When determining in this way, the first control section 51 only has to perform processing for adding one to the first control section side axis number to match the first control section side axis number and the second control section side axis number.

As explained above, the robot arm 22 according to this embodiment includes the plurality of arms 221 to 226. The robot system 1 includes the encoders 24 respectively corresponding to the arms 221 to 226. As shown in FIGS. 6 and 7, the first control section 51 has a function of executing comparison processing for comparing the first control section side axis number, which is first individual information, held by the first control section 51 according to the interrupt signals si1, si2, and si3, and the second control section side axis number, which is second individual information requested and acquired from the second control section 52 according to the interrupt signals si1, si2, and si3.

With such a configuration, it is possible to detect noise and missing of the interrupt signals si1, si2, and si3 by comparing the first control section side axis number and the second control section side axis number. Consequently, it is possible to prevent various kinds of processing from being continued while overlooking an abnormal interrupt signal. As a result, it is possible to prevent detection accuracy of the positions and the speeds of the axes from being deteriorated.

When missing of the interrupt signals si1, si2, and si3 frequently occurs, detection accuracy of the positions and the speeds of the axes is deteriorated. Therefore, the robot system 1 may stop the operation of the robot system 1.

As an example, the first control section 51 may have a function of outputting an abnormal signal when the first control section side axis number, which is the first individual information, and the second control section side axis number, which is the second individual information, are different a predetermined number of times or more as a result of the comparison processing. Consequently, the control device 5 can stop the operation of the robot system 1 based on the abnormal signal. As a result, it is possible to improve safety of the robot system 1.

The output of the abnormal signal may be performed in both of or may be performed in one of the case in which noise is mixed in the interrupt signals si1, si2, and si3 and the case in which missing occurs in the interrupt signals si1, si2, and si3. For example, when missing of the interrupt signals si1, si2, and si3 occurs a predetermined number of times or more, influence on detection accuracy of the positions and the speeds of the axes is considered to be large. Therefore, it is desirable to output the abnormal signal. The predetermined number of times is not particularly limited but is set to, for example, three times or more.

The robot system and the control method for the robot system according to the present disclosure are explained above based on the illustrated embodiment. However, the present disclosure is not limited to this. The components of the sections can be replaced with any components having the same functions. Any other components may be added to the embodiment.

What is claimed is:

1. A robot system comprising:
a plurality of robot arms
a camera disposed at one of the plurality of robot arms and configured to acquire an image of a target object;
a plurality of encoders respectively located at the plurality of robot arms, each of the plurality of encoders being configured to acquire position information of a corresponding arm of the plurality of robot arms;
a first processor configured to execute a first program to control movement of the plurality of robot arms and perform processing of the image acquired by the camera, the first processor being configured to save first data into only a first memory; and
a second processor configured to execute a second program to generate a timing signal, the second processor being configured to save second data into only a second memory different from the first memory,
wherein the first processor is configured to:
save the acquired image as the first data into the first memory;
perform image processing based on the saved image to control the plurality of robot arms;
send a robot arm number information request signal to the second processor, each of the plurality of robot arms having a different robot arm number corresponding to robot arm number information;
receive the robot arm number information including a robot arm number from the second processor; and
count a number of interruption signals from the second processor,
the second processor is configured to:
periodically send the interrupt signal to the first processor and a position information request signal for requesting the position information to at least one of the plurality of encoders at the same time based on the timing signal;
receive the robot arm number information request signal from the first processor;
send the robot arm number information relating to one of the plurality of robot arms corresponding to one of the plurality of encoders to which the position information request signal is sent when the robot arm number information request signal is received; and
receive the position information from the at least one of the plurality of encoders and save the position information as the second data into the second memory,
the first processor is configured to read the position information from the second memory and control the movement of the plurality of robot arms based on the interrupt signal, the saved image, and the read position information, and
the first processor is configured to perform comparison processing for comparing between the counted number of the interruption signals and the robot arm number corresponding to the received robot arm number information.

2. The robot system according to claim 1, wherein the plurality of encoders are multiplexed.

3. The robot system according to claim 1, wherein the second processor is configured to repeatedly send the position information request signal at a predetermined interval.

4. The robot system according to claim 1, wherein the first processor is configured to output an abnormal signal when the counted number of the interruption signals and the robot arm number corresponding to the received robot arm number information are different a predetermined number of times or more as a result of the comparison processing.

5. A control method for a robot system, the robot system including:
a plurality of robot arms;
a camera disposed at one of the plurality of robot arms and configured to acquire an image of a target object; and
a plurality of encoders respectively located at the plurality of robot arms, each of the plurality of encoders being configured to acquire position information of a corresponding arm of the plurality of robot arms;
the control method for causing a first processor to execute a first program and causing a second processor to execute a second program, the control method comprising executing on the first and second processors the steps of:
controlling, by the first processor, movement of the plurality of robot arms and performing processing of the image acquired by the camera, the first processor being configured to save first data into only a first memory;
generating, by the second processor, a timing signal, the second processor being configured to save second data into only a second memory different from the first memory;
saving, by the first processor, the acquired image as the first data into the first memory;
performing, by the first processor, image processing based on the saved image to control the plurality of robot arms;
sending, by the first processor, a robot arm number information request signal to the second processor, each of the plurality of robot arms having a different robot arm number corresponding to robot arm number information;
periodically sending, by the second processor, an interrupt signal to the first processor and a position information request signal for requesting the position information to at least one of the plurality of encoders at the same time based on the timing signal;
counting, by the first processor, a number of the interruption signals from the second processor,
receiving, by the second processor, the robot arm number information request signal from the first processor;
sending, by the second processor, the robot arm number information relating to one of the plurality of robot arms corresponding to one of the plurality of encoders to which the position information request signal is sent when the robot arm number information request signal is received;
receiving, by the first processor, the robot arm number information including a robot arm number from the second processor;
receiving, by the second processor, the position information from the at least one of the plurality of encoders and save the position information as the second data into the second memory,
wherein the first processor is configured to read the position information from the second memory and control the movement of the plurality of robot arms based on the interrupt signal, the saved image, and the read position information, and
the first processor is configured to perform comparison processing for comparing between the counted number of the interruption signals and the robot arm number corresponding to the received robot arm number information.

\* \* \* \* \*